March 28, 1950        H. GUIBOR        2,502,217
SCRAPER

Filed Dec. 12, 1945        4 Sheets-Sheet 1

INVENTOR.
Harry Guibor
ATTYS

INVENTOR.
Harry Guibor
ATTYS

Patented Mar. 28, 1950

2,502,217

UNITED STATES PATENT OFFICE 2,502,217

SCRAPER

Harry Guibor, Woodland, Calif.

Application December 12, 1945, Serial No. 634,463

1 Claim. (Cl. 37—169)

This invention relates in general to improvements in earth working implements.

In particular the invention is directed to, and it is an object to provide, a novel tractor-drawn drag scraper especially designed for finish leveling of land.

Another object of the invention is to provide a drag scraper which includes a main frame carried adjacent its rear end by wheels, a scraping blade ahead of the wheels, and a unique, power-actuated bellcrank assembly vertically adjustably supporting the forward end of the main frame; said bellcrank assembly being adapted to be hitched to a tractor in draft relation.

A further object of the invention is to provide a scraper wherein adjustment of the main frame relative to horizontal, and regulation of the vertical or digging position of the scraping blade, are both accomplished by means of reversible, electric power winches.

An additional object of the invention is to incorporate automatic leveling mechanism in the implement arranged to cause the reversible power winch, which corresponds to and controls the position of the main frame, to maintain said main frame horizontal whereby the implement is operative to finish level areas of ground without depending on the eye or ability of the operator, and regardless of the rise or fall of the tractor as it traverses uneven ground.

It is also an object to provide automatic leveling mechanism, as in the preceding paragraph, which includes a special electric circuit having a novel mercury switch therein; said mercury switch being responsive to any changes or variation in the level of the scraper main frame, and to thus place the leveling mechanism in operation.

A further object of the invention is to provide a scraper which is exceedingly effective for the purpose designed.

These objects are accomplished by means of such structure and relative arrangement of parts as will fully appear by a perusal of the following specification and claim.

In the drawings similar characters of reference indicate corresponding parts in the several views.

Figure 1:
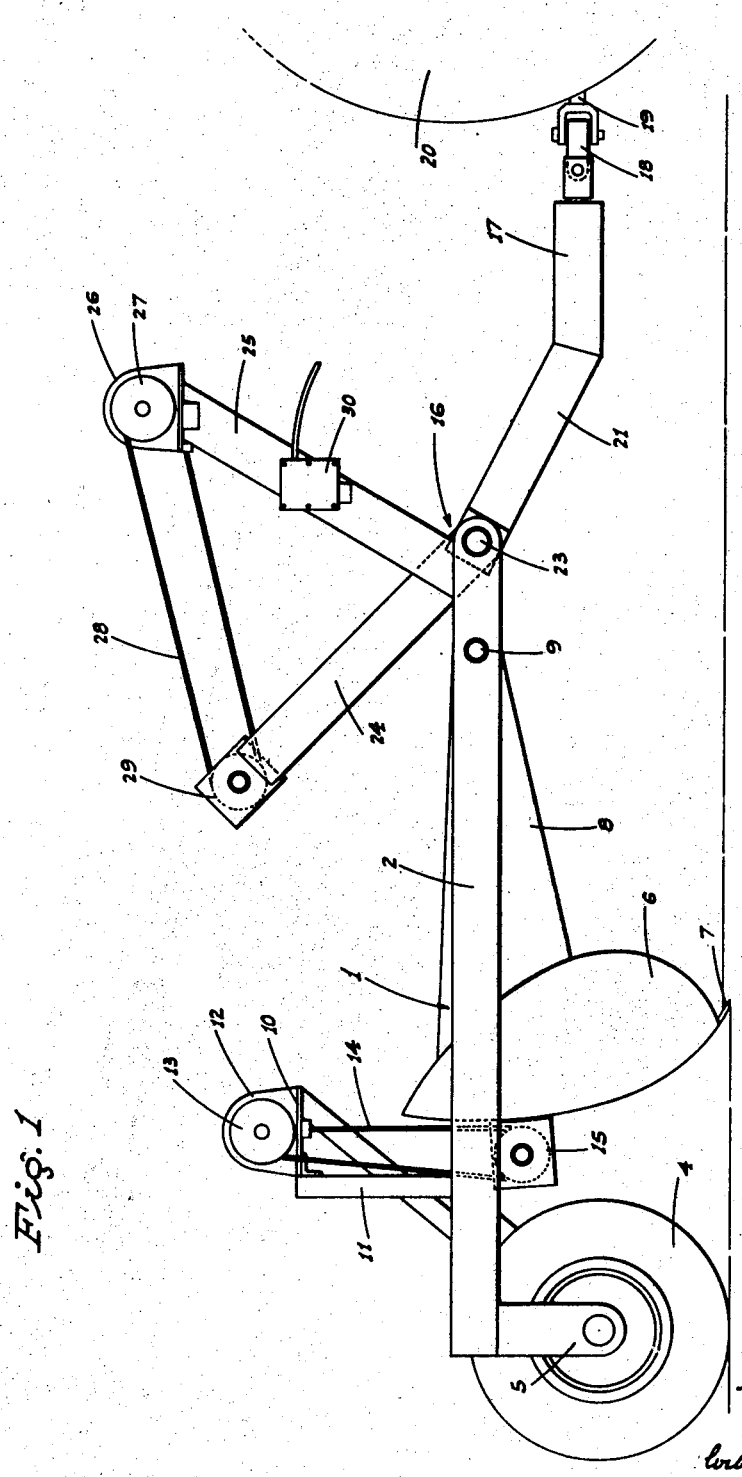
Figure 1 is a side elevation of the implement in use.
Figure 2:
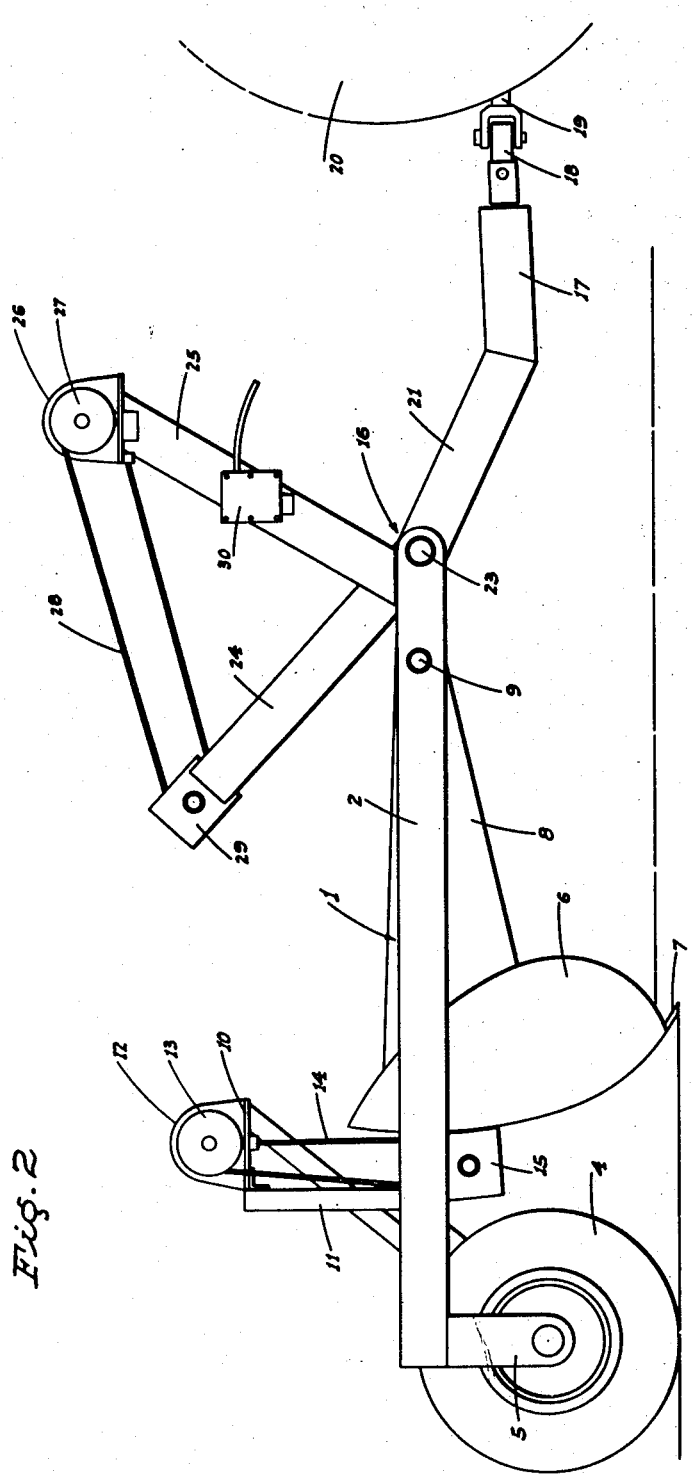
Figure 2 is a similar view, but shows the position of the parts, particularly the deeper cut of the blade, when the implement has been raised at the front, on account of uneven ground, and the automatic leveling mechanism has functioned.
Figure 3:
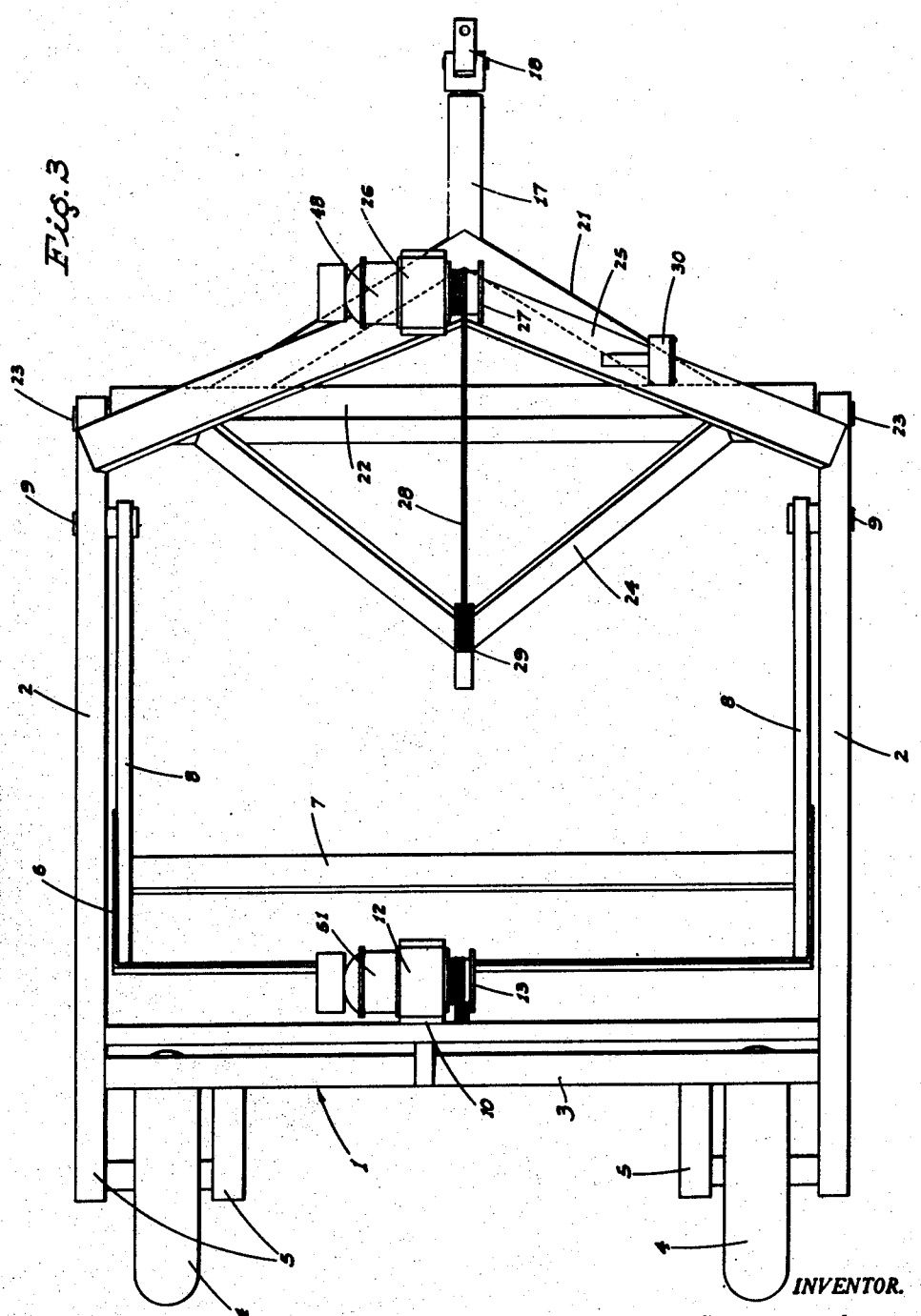
Figure 3 is a plan view of the implement.
Figure 4:
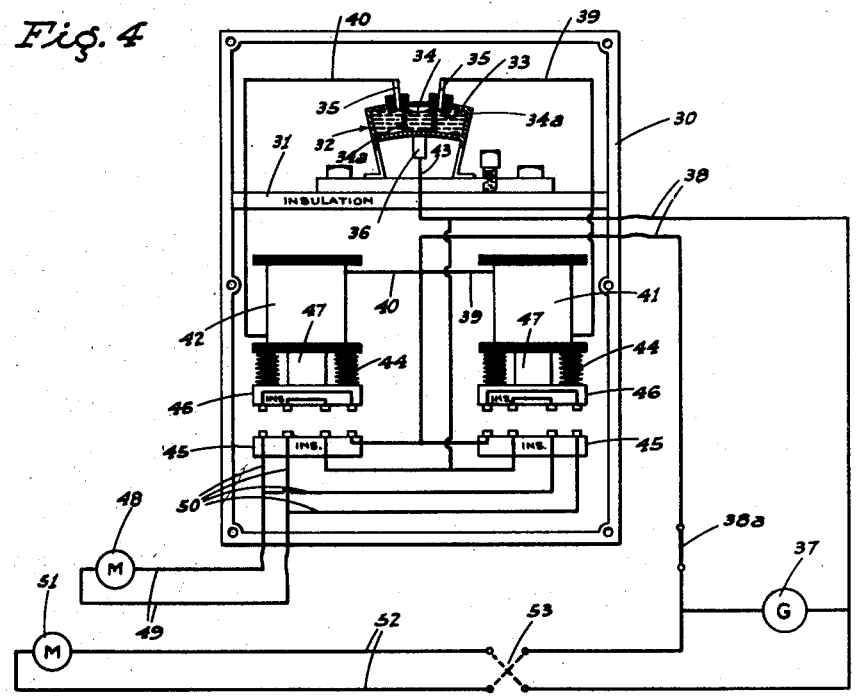
Figure 4 is a diagram of the electric circuit of the control mechanism, with said circuit in its normal position, i. e. when the implement main frame is horizontal.
Figure 5:
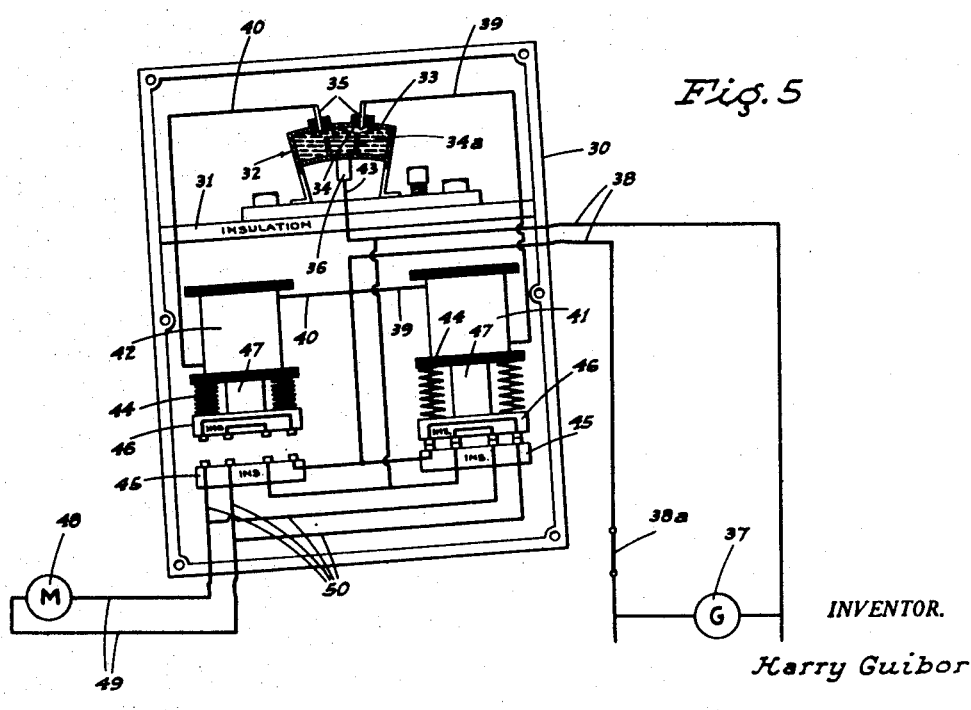
Figure 5 is a view similar to Figure 4, but shows the position of the parts of the circuit when the implement is raised at the front, as by the tractor riding over a high spot, but before the leveling mechanism has functioned to relevel said main frame of the implement.

For the purpose of clarity the electric circuit is shown only in Figs. 4 and 5, and the exposed lead cables which are included in such circuit are omitted from Figs. 1–3, inclusive.

Referring now more particularly to the characters of reference on the drawings, the implement comprises a main frame, indicated generally at 1, which includes a pair of transversely spaced, longitudinal side beams 2 connected together in rigid relation adjacent their rear ends by a rear end beam 3. The main frame 1 is supported, at the rear, by transversely spaced pneumatic-tired wheels 4, each of which is journaled in connection with a wheel mount 5; the tread of the wheels being lesser than the width of a drag-type scraper bowl 6 included in the implement directly ahead of the wheels 4 and extending transversely of the main frame 1.

The drag-type scraper bowl 6 includes, at its lower edge, a forwardly and downwardly inclined scraper blade 7. Draft arms 8 are fixed in connection with the opposite ends of the bowl 6 and project forwardly to pivotal connection, as at 9, with the side beams 2 adjacent but short of the forward ends of the latter; said draft arms 8 being disposed adjacent but to the inside of the side beams 2.

The scraper bowl 6 is vertically adjustably suspended from the main frame 1 as follows:

A transverse platform 10 is disposed some distance above the scraper bowl 6, and said platform is supported, at its ends, by upstanding posts 11 on the main frame. A reversible electric power winch 12, including an automatic electric brake which normally holds but automatically releases when the winch is actuated, is mounted on the platform 10 intermediate the side beams 2. The power winch 12 includes a cable drum 13 at one end thereof, and a cable system 14 extends between the drum 13 and a sheave 15 fixed on the back of the scraper bowl 6 some distance above ground. With operation of the power winch 12 in one direction, the cable system 14 is shortened causing raising of the scraper bowl 6, while operation of the power winch 12 in a reverse direction results in lengthening of the cable system 14 and lowering of said bowl. In this manner the scraper blade 7 may be vertically adjusted to desired working position. The power winch 12 is controlled by the operator, and through the medium of the circuit hereinafter described.

At the forward end the main frame 1 is vertically adjustably supported by a novel bellcrank assembly, indicated generally at 16, which comprises the following:

A forwardly projecting tongue 17 is fitted, at its front end, with a hitch 18 adapted to be coupled to the drawbar 19 of a tractor, indicated diagrammatically and in part at 20. At its rear end the tongue 17 is fixed to a pair of diverging, upwardly and rearwardly inclined legs 21, which legs, in turn, are fixed to a front cross beam 22 which is pivotally mounted at its end, as at 23, to the front ends of the side beams 2 of the main frame 1.

An upwardly and rearwardly inclined A-frame 24 is fixed on the rotatable front cross beam 22 and extends upwardly to a termination some distance above the main frame 1; the latter including a forwardly and upwardly inclined A-frame 25 which likewise extends upwardly to a termination above the main frame 1 and normally somewhat above the corresponding end of the A-frame 24.

A reversible electric power winch 26, including an automatic electric brake, which normally holds but automatically releases when the winch is actuated, is mounted on the apex of the A-frame of the main frame 1. The power winch 26 includes a cable drum 27, and a cable system 28 connects between said drum 27 and a sheave 29 fixed on the apex of the A-frame 24 of the bellcrank assembly 16.

The power winch 26 is thus operative by shortening or lengthening of the cable system 28 to raise or lower, respectively, the forward end of the main frame 1, and said power winch is controlled by the hereinafter described leveling mechanism so as to maintain the main frame 1 normally horizontal in order that the scraper blade 7 cut, at all times, in a true horizontal path. Thus, even though the tractor and implement traverse somewhat uneven ground the scraper blade 7 is automatically adjusted to work the ground to level.

The mechanism by means of which the power winch 26 is controlled to automatically level the main frame comprises the following:

A control box 30 is mounted vertically on one side of the A-frame 25, and includes the major parts of the leveling mechanism as incorporated in the electrical circuit as shown in Figs. 4 and 5, and to which specific reference is now made.

A normally horizontal platform 31 is mounted in the control box 30 and supports, in normally fixed but vertically adjustable relation, a mercury switch, indicated generally at 32. The mercury switch 32 includes an upwardly arched, tubular body 33 of metal, said body being filled with mercury, as shown, with the exception of a bubble 34 which normally rides the top of the tubular body 33 centrally of its ends. Baffles 34a damp the motion of the bubble, as is desirable.

A pair of electrodes 35 project, in insulated relation, through the top of the tubular body 33, beyond opposite ends of the bubble 34 and normally clear thereof, whereby said electrodes normally maintain contact with the mercury. A bottom electrode or terminal 36 connects to the metal tubular body 33 at the bottom intermediate its ends.

An electric generator 37 is mounted on and driven by the tractor, and a current supply circuit 38 leads from the generator rearwardly from the tractor into the control box; there being a normally closed, manually operated switch 38a in said circuit 38. Within the control box 30 the current supply circuit 38 is connected, in energizing relation, through independent control circuits 39 and 40, with normally energizing and open solenoid switches 41 and 42, respectively, likewise mounted in the control box 30 below the platform 31. The control circuits 39 and 40 for the solenoid switches 41 and 42 are fed from one side of the current supply circuit 8 by a common lead 43, which connects to the bottom electrode or terminal 36 of the mercury switch 32; the latter being interposed in said control circuits 39 and 40, as shown, and each of said circuits including one of the electrodes 35. It is thus necessary that current flow exist, through the switch 32, between each electrode 35 and the bottom electrode 36 to maintain the coil of the corresponding solenoid switch energized and said switch open, as said switches tend to close under the influence of springs 44 included therein. The normally energized and open solenoid switches 41 and 42 each include a fixed contact block 45 and a movable contact block 46; the latter being under the control of a corresponding solenoid plunger 47.

The reversible electric motor of the power winch 26 is indicated in Figs. 4 and 5 at 48, and such motor is interposed in a motor control circuit 49. Reversing circuits, indicated generally at 50, lead from the fixed contact blocks 45 of the solenoid switches 41 and 42 to the motor control circuit 49. When one of said reversing circuits 50 is energized by closing of the corresponding solenoid switch, the electric motor 48 runs in one direction, while energization of the other reversing circuit 50 by its solenoid switch causes operation of the electric motor 48 in an opposite direction.

As the solenoid switches 41 are normally open, the power winch 26 is thus not in operation.

However, if the implement should raise, for example, at the front with movement of the tractor over a rise in the ground, the control box 30 is tilted, as shown in Fig. 2. When this occurs the bubble 34 runs forwardly in the tubular body 33 to a position surrounding the foremost electrode 35, which electrode is then out of contact with the mercury in the switch 32. This breaks the solenoid switch control circuit 39, and the corresponding solenoid switch 41 is deenergized, whereupon said switch closes by movement of the corresponding contact block 46 into engagement with the fixed contact block 45. In turn this results in energization of the corresponding reversing circuit 50 and the motor control circuit 49, whereupon the electric motor 48 rotates in a direction such that the power winch 26 runs in a direction to lengthen the cable system 28 to such extent that the main frame 1 returns to normal horizontal position. When the horizontal position of said main frame 1 is re-established, the bubble 34 shifts to its normal position, as shown in Fig. 4, at which time both solenoid switches are open and the power winch 26 not in operation.

Should the main frame drop at the forward end, the operation of the leveling mechanism is the reverse to that above described and the solenoid switch 42 is closed rather than the solenoid switch 41, whereby said main frame is raised at its forward end, rather than being lowered at its forward end, until horizontal position is reestablished.

The motor for the power winch 12 is indicated at 51, which motor is included in a motor control circuit 52 leading from the generator 37. The motor circuit 52 has a manually operated reversing switch 53 therein, whereby the motor 51 may be run in one direction or the other to raise or lower the scraper bowl 6; i. e. to alter the working position thereof.

The motors 48 and 51 are here shown as being of that particular reversible type which allows of the use of a two-load connection with their respective switches and the source of current.

The scraper bowl 6, when once adjusted to a working position, is not usually changed during operation of the implement, and the automatic leveling mechanism is relied upon to assure that the scraper blade 7 cuts level at all times.

Additionally, it should be noted that due to the fact that the tread of the wheels 4 is less than the width of the scraper blade 7, said wheels travel on the leveled ground and thus do not adversely affect operation of the automatic leveling mechanism.

From the foregoing description it will be readily seen that there has been produced such a device as substantially fulfills the objects of the invention, as set forth herein.

While this specification sets forth in detail the present and preferred construction of the device, still in practice such deviations therefrom may be resorted to as do not form a departure from the spirit of the invention, as defined by the appended claim.

Having thus described the invention, the following is claimed as new and useful, and upon which Letters Patent are desired:

A leveling scraper comprising a main frame, wheels supporting such main frame at its rear end, a land leveling scraper blade suspended from the main frame, a bell crank, such bell crank being pivoted at its apex to the forward end of the main frame for pivotal movement relative thereto on a horizontal axis, one arm of the bell crank projecting forwardly from said pivot point, coupling means at the forward end of said arm for connection with a tractor for pivotal movement with respect thereto on a horizontal axis, the other arm of the bell crank projecting upwardly from the pivot point of the bell crank with the main frame, an upstanding member projecting upwardly from the main frame and forwardly of the upstanding arm of the bell crank, a block and tackle system connected between the upper ends of the upstanding bell crank arm and the upstanding member on said main frame and effective to normally hold the main frame in level position, a reversible electric motor mounted on said upstanding member and connected in driving relation with said block and tackle system, a reversing electric circuit connected with the motor, a double action switch in said circuit, said switch being effective to close the circuit to the motor in one direction or the other in response to deviations of the main frame from such normally level position.

HARRY GUIBOR.

REFERENCES CITED

The following references are of record in the file of this patent:

UNITED STATES PATENTS

| Number | Name | Date |
|---|---|---|
| 1,512,614 | Le Tourneau | Oct. 21, 1924 |
| 2,015,880 | Wold | Oct. 1, 1935 |
| 2,101,400 | Lawler | Dec. 7, 1937 |
| 2,284,550 | Adams | May 26, 1942 |